(12) United States Patent
Kim

(10) Patent No.: US 6,571,109 B1
(45) Date of Patent: May 27, 2003

(54) WIRELESS LOCAL LOOP SYSTEM ENABLING FAX SERVICE AND METHOD OF PERFORMING FAX DATA SERVICE

(75) Inventor: Tae Won Kim, Kyonggi-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/458,057

(22) Filed: Dec. 10, 1999

(30) Foreign Application Priority Data

Dec. 15, 1998 (KR) .............................................. 98-55160

(51) Int. Cl.⁷ .............................. H04B 1/38; H04M 1/00
(52) U.S. Cl. ...................... 455/555; 455/557; 358/442; 358/444
(58) Field of Search ................................. 455/557, 414, 455/555, 344, 66; 358/444, 442

(56) References Cited

U.S. PATENT DOCUMENTS

| | | | |
|---|---|---|---|
| 5,748,610 A | * | 5/1998 | Bustamante et al. ........ 370/208 |
| 6,055,441 A | * | 4/2000 | Wieand et al. ............... 455/557 |
| 6,101,398 A | * | 8/2000 | Joong et al. ................. 455/557 |
| 6,157,846 A | * | 12/2000 | Manning et al. ............. 455/557 |

* cited by examiner

Primary Examiner—Dwayne Bost
Assistant Examiner—L West
(74) Attorney, Agent, or Firm—Fleshner & Kim, LLP

(57) ABSTRACT

Disclosed the-wireless local loop system which can support both an wireless voice service and a FAX data service by improving a current CDMA WLL system to be supported the FAX service function. The system provides a voice service and a FAX service using the first and second modems for each facsimile/telephone connected to the wire/wireless communication network of the fixed subscriber unit or the processing unit.

13 Claims, 6 Drawing Sheets

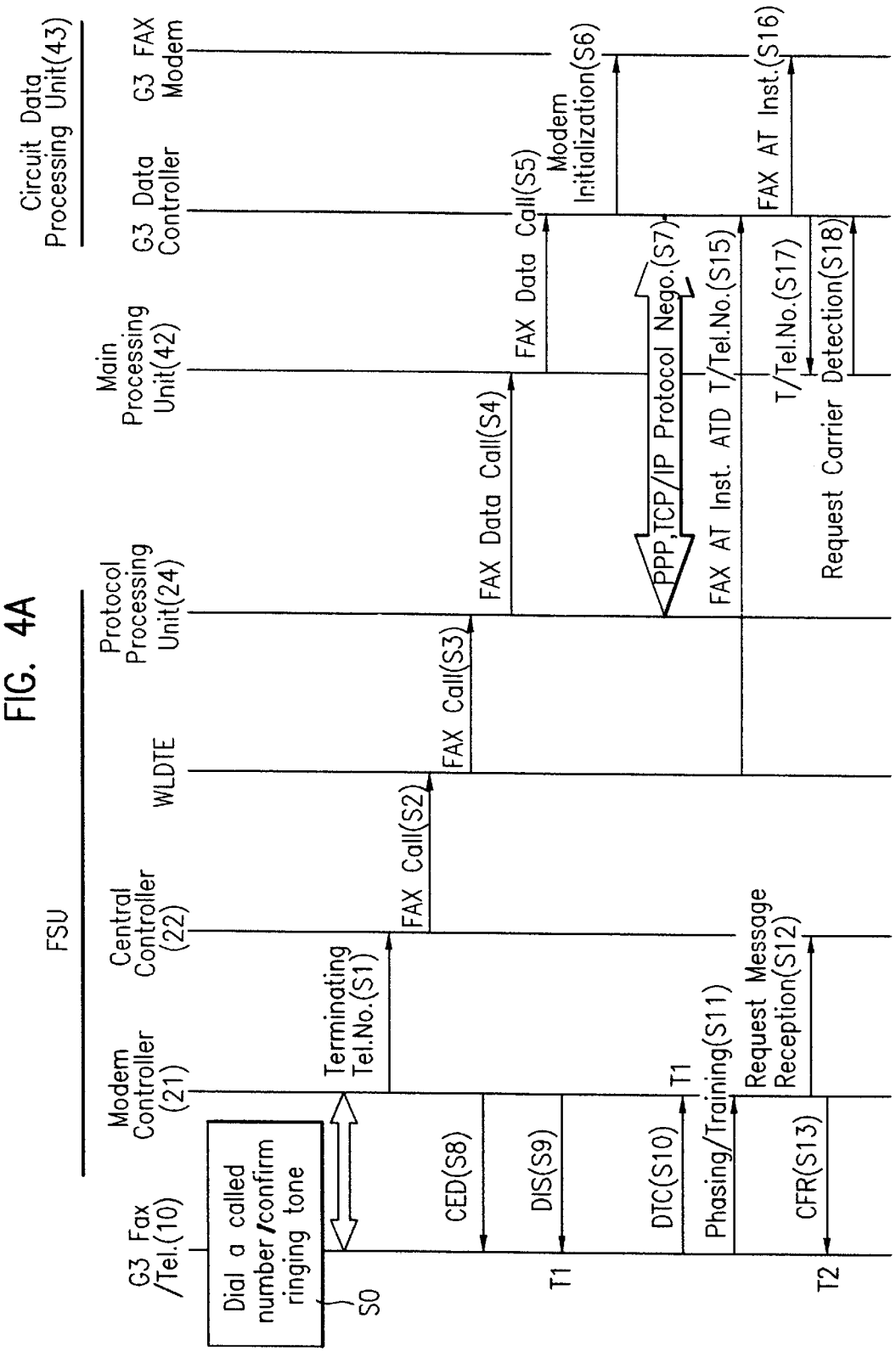

WIRELESS LOCAL LOOP SYSTEM ENABLING FAX SERVICE AND METHOD OF PERFORMING FAX DATA SERVICE

BACKGROUND OF THE INVENTION

1. Field of the Invention

The present invention relates to an wireless local loop (WLL) system enabling FAX service, and more particularly to an wireless local loop network and a method of performing FAX data service in the wireless local loop system which can selectively provide voice service and FAX service to each subscriber of the WLL system by using modems for the FAX service equipped in a code division multiple access (CDMA) WLL system.

2. Background of the Related Art

Generally, a G3 facsimile/telephone has been most widely using for FAX service in the field utilizing a public switching telephone network (PSTN). Also, a digital FAX service was suggested in the field by applying a FAX emulator on a personal computer (PC).

However, the more the resent communication technique has been continuously developed in the field, the more the subscribers of the communication networks are eagerly requesting the multiple communication services. Specially, if the subscribers of the WLL system requests the FAX service with only using the G3 facsimile/telephone in the current wired network, without additional network elements, but the current WLL system merely support the voice service at present.

Accordingly, if the FAX service is additionally supported to the current WLL system which support the wireless voice service, a competitive for the product will strength and the convenience in usage the product will increase therefrom.

SUMMARY OF THE INVENTION

An object of the present invention is to at least substantially obviate one or more of the problems due to limitations and disadvantages of the related art and provide at least the advantages set forth below.

Another object of the present invention is to provide an WLL system and method of performing FAX data service in the wireless local loop system which can support both wireless voice service and FAX data service by improving a current CDMA WLL system to be additionally supported the FAX service function without additional network elements.

In order to achieve the object according to the invention, an wireless local loop system enabling FAX service comprising: a fixed subscriber unit for, having a first modem, providing wire/wireless connection function and wireless FAX communication function; a base station for transiting a signal provided from the fixed subscriber unit; and a processing unit for, having a second modem and connected to both the mobile station and a wire/wireless communication network, controlling a data path and signalling path in accordance with the signal provided from the base station or the wire/wireless communication network; wherein, the system provides a voice service and a FAX service using the first and second modems for each facsimile/telephone connected to the wire/wireless communication network of the fixed subscriber unit or the processing unit.

Also, the object according to the invention, A method of performing FAX data service in wireless local loop system having at least a fixed subscriber unit, a base station, WLL system, the method comprising the steps of: assigning modems for FAX service placed in the WLL system and a fixed subscriber unit in accordance with a facsimile/telephone connected to the fixed subscriber unit or the WLL system, setting an wireless link protocol between the fixed subscriber unit and the WLL system, and setting a call between the fixed subscriber unit and the WLL system by initiating modems, respectively; exchanging parameters between the fixed subscriber unit and the WLL system; transmitting voice data or FAX data from a facsimile/telephone of an originating party to a facsimile/telephone of a terminating party.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIGS. 4A and 4B are timing sequence diagrams illustrating originating procedure for FAX data according to a preferred embodiment of the present invention.

DETAILED DESCRIPTION OF PREFERRED EMBODIMENTS

Now, a preferred embodiment of the present invention which can be embodied the object in detail, will be explained with reference to the attached drawings.

Figure 1:
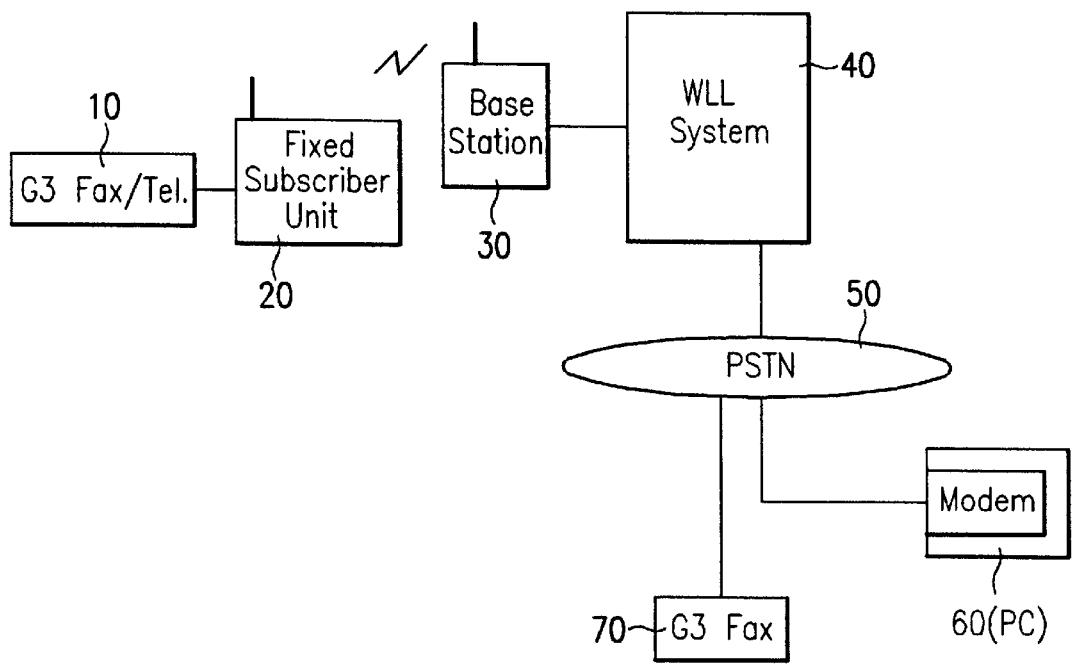
FIG. 1 is a block diagram of a CDMA wireless local loop (WLL) system according to the present invention.

FIG. 1 is a block diagram of a CDMA wireless local loop (WLL) system according to the present invention. With reference to the FIG. 1, the wireless local loop system enabling FAX service includes a facsimile/telephone 10; a fixed subscriber unit 20 for, having a first modem and connected to the facsimile/telephone 10, providing wire/wireless connection function and wireless FAX communication function; a base station 30 for transiting a signal provided from the fixed subscriber unit 20; and a WLL processing unit 40 for, having a second modem and connected to both the mobile station and a wire/wireless communication network, controlling a data path and signalling path in accordance with the signal provided from the base station 30 or the communication network such as a public switching telephone network (PSTN) 50. Here, each of the G3 facsimile/telephone 10, the fixed subscriber unit 20, and the base station 30 was shown in FIG. 1, for the sake of convenience, but each element may be increased, if necessary. Additional G3 facsimile devices 70 and/or personal computers (PC) 60, which can include a modem 61, can be connected to the PSTN 50.

In FIG. 1, if the fixed subscriber unit 20 and the G3 facsimile/telephone 10 are connected each other with a jack RJ-11, T.30 protocol is provided between the G3 facsimile/ telephone 10 and the fixed subscriber unit 20. At this time, the wireless FAX communication can be performed by setting a service option of the G3 facsimile/telephone 10 as a FAX class 2 or 2.0.

Figure 2:
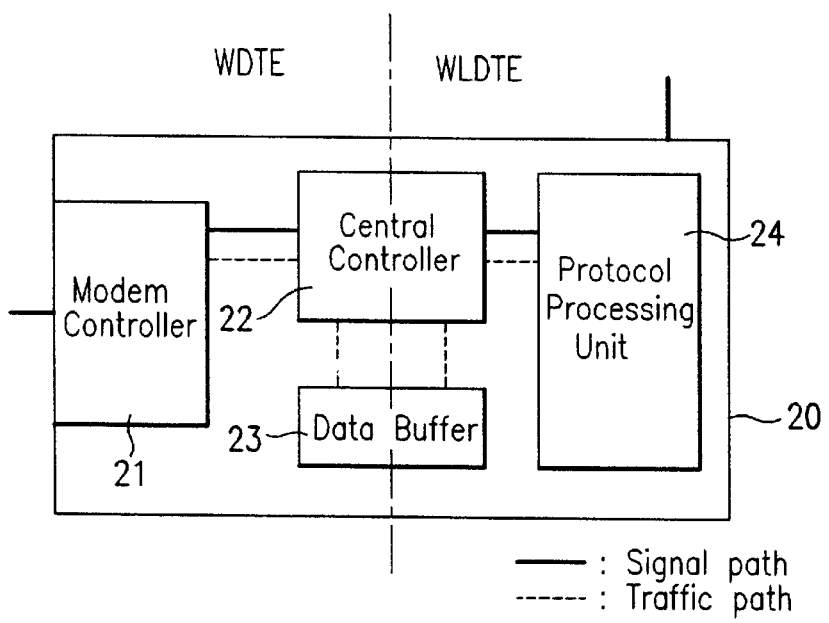
FIG. 2 is a block diagram of a fixed subscriber unit illustrated in FIG. 1.

FIG. 2 is a block diagram of the fixed subscriber unit 20 which merely provides G3 facsimile inter-working function illustrated in FIG. 1. In accordance with FIG.2, the fixed subscriber unit 20 includes a modem controller 21 for performing T.30 protocol communication with the facsimile/telephone 10; a central controller 22 for controlling an operation of the fixed subscriber unit 20 to support the wire/wireless connection function and the wireless FAX communication function; a data buffer 23 for buffering an input or output FAX data in accordance with a first control signal of the central controller 22; and a protocol processing unit 24 for requesting FAX data call to the WLL processing unit 40 in accordance with a second control signal of the central controller 22.

The fixed subscriber unit 20 can be divided in two functions of an wire data terminal equipment (WDTE) and an wireless data terminal equipment (WLDTE) in view of its functions in software as shown in FIG. 2. The modem controller 21 has functions of providing a dial tone or a ring tone to the G3 facsimile/telephone 10 connected to the fixed subscriber unit 20 and detecting a DTMF tone in the G3 facsimile/telephone 10.

The WLL system 40 includes a main processing unit 42 for discriminating a service option of the facsimile/telephone 10; an wireless link protocol processing unit 41 for controlling an wireless data path for the FAX data service in accordance with the service option; a circuit data processing unit 43 for assigning a modem for FAX service if the data service is required from the wireless link protocol processing unit and setting the wireless link protocol between the fixed subscriber unit 20 and the base station 30; and a relay connecting unit 44 for, coupled to the main processing unit and the circuit data processing unit 43, providing a signalling and data paths to the wire/wireless network.

In this case, many G3 facsimile/telephone may be equipped in the circuit data processing unit 43 of the WLL system 40. And, the G3 facsimile/telephone 10 has the following functions.

First, the circuit data processing unit 43 triggers each G3 facsimile/telephone in response to corresponding each call, if the service option received from the facsimile/telephone 10 requests the FAX service. And the facsimile/telephone 10 initializes corresponding modem equipped in the circuit data processing unit 43 in order to support the FAX modem function.

Second, the facsimile/telephone 10 checks the interconnection state of a terminating facsimile, and relays the parameters exchange performed between the originating/terminating facsimiles and manages the current state according to each state transition.

Third, the facsimile/telephone 10 maintains the interconnection of the FAX modem by periodically supplying a virtual FAX data and a Fill data (Zero or oxFF) since the FAX modem is sensitive to the time due to the FAX data which is forwarded with a delay time relative to the voice data in a step of transmitting the FAX data.

Forth, the facsimile/telephone 10 performs the function mentioned in the third case when the FAX data is delayed due to an wireless area's problems during transmitting the FAX data.

Fifth, the facsimile/telephone 10 forwards the FAX data to the FAX modem as the FAX data is queuing as maximum as possible if the wireless area is good state. And, under going such operation, the facsimile/telephone 10 checks the queuing data amount when there is problems on transmitting the FAX data, and controls or adjusts the virtual FAX data and Fill data mentioned in the second and third cases. Thus, the quality of FAX data will increase thereby.

The originating and terminating operations of the FAX data in the CDMA WLL system will be explained with reference to attached FIGS. 4A–4B and 5A–5B.

Figure 3:
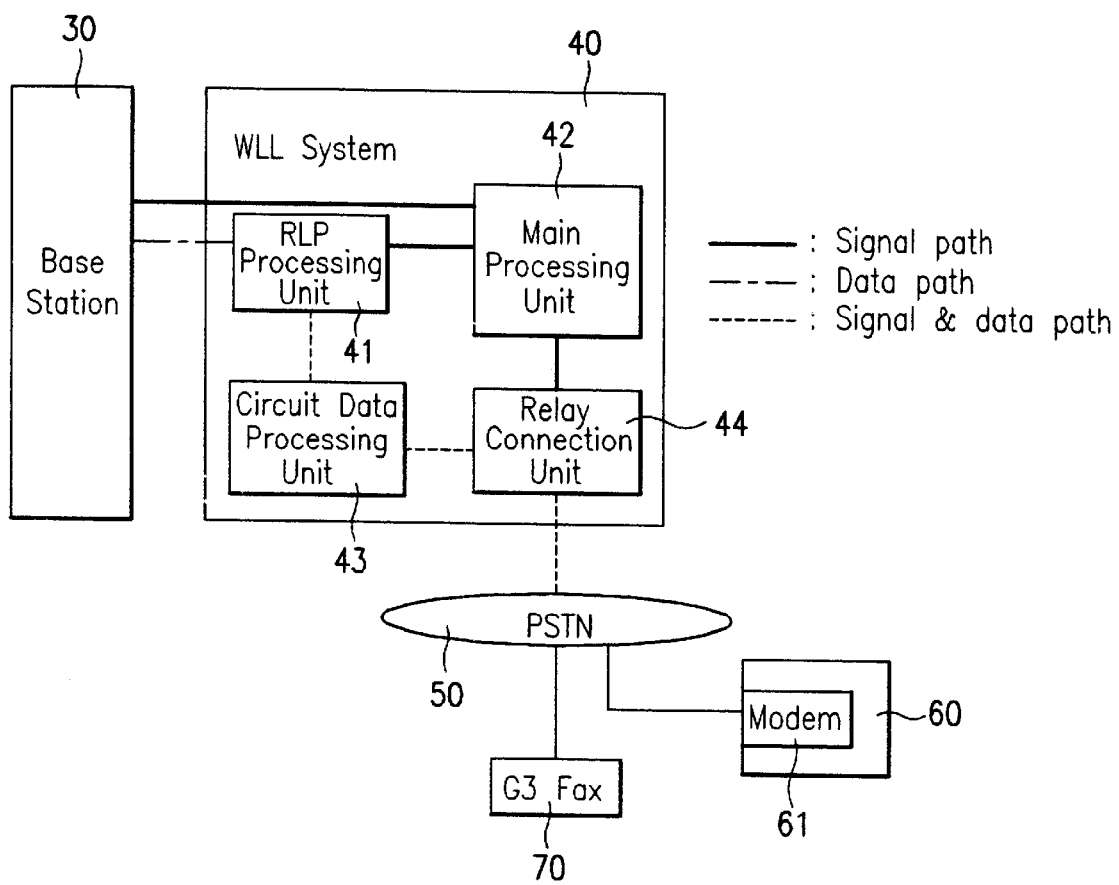
FIG. 3 is a block diagram of an WLL processing unit illustrated in FIG. 1.

In the preferred embodiment of the present invention, it is considered based on the CDMA WLL network shown in FIG. 1 that the facsimile/telephone 10 and a fixed subscriber unit 20, the structure of the fixed subscriber unit 20 are those of FIG. 3.

First, the originating operation of the G3 facsimile/telephone will be explained hereinafter.

A subscriber of the CDMA WLL network hang up the facsimile/telephone 10 connected the fixed subscriber unit 20 shown 20 in FIG. 2, and dials a terminating telephone number after hearing a dial tone supplied the fixed subscriber unit 20 (SO). A modem controller 21 of the fixed subscriber unit 20 receives the telephone number, and then forwards the telephone number to the central controller 22 of the fixed subscriber unit 20 using a detecting device (not shown) equipped in the modem controller 21 detecting the DTMF tone (S1). Next, the modem controller 21 checks that the entire telephone number is received completely, and provides a ring tone to the originating G3 facsimile/telephone 10. At this stage, the central controller 22 of the fixed subscriber unit 20 requests a call for FAX service to the protocol processing unit 24 (S2, S3). Then, the protocol processing unit 24 requests the call for FAX service to the base station 30 using the terminating telephone number and service option number 5 or 13. The base station 30 receives the call for FAX service and requests a FAX data call to the main processing unit 42 of the WLL system 40. At this stage, the main processing unit 42 confirms the FAX data call and notifies the state that the FAX data call is requested. And the circuit data processing unit 43 allocates a G3 FAX modem resource through the G3 FAX data controller (not shown) and sets up the radio rink protocol (RLP) which is used the area between the fixed subscriber unit 20 and the base station 30 (S5). Next, the G3 FAX data controller initializes the G3 FAX modem which is allocated (S6) and PPP TCP/IP protocol is set up between the fixed subscriber unit 20 and the G3 FAX data controller of the circuit data processing unit 43 of the WLL system 40.

While, the fixed subscriber unit 20 forwards a called station identification (CED) and a digital identification signal (DIS) to the G3 facsimile/telephone 10 in turn after forwarding the ring tone in order to notify the modem information of the fixed subscriber unit 20 (S8, S9). Here, the DIS is determined to forward to the originating G3 facsimile/telephone 10 within T1 time (35+/–5 second). Accordingly, the fixed subscriber unit 20 observes the PPP, TCP/IP setting time consumed in the protocol processing unit 24 using such T1 time, and forwards the DIS to the G3 facsimile/telephone 10 after passing a proper time (about 25 second) or the central controller 22 of the fixed subscriber unit 20, which confirmed that "+FCON,+FDIS:OK" signal from the WLL system 40 are received, can forward the DIS for a next phase.

The G3 facsimile/telephone 10 received the DIS forwards a digital transit command (DTC) to the fixed subscriber unit 20 (S10). Then, the modem controller 21 requests a message reception to the central controller 22, if the state parameters negotiates between the G3 facsimile/telephone 10 and the modem controller 21 using the phasing and training (S11, S12). At this stage, if the modem controller 21 forwards a confirmation to receive (CFR) signal to the G3 facsimile/telephone 10, the G3 FAX data message having T.4 formation is forwarded to the fixed subscriber unit 20 (S13, S14).

Meanwhile, the wireless data terminal (WLDTE) of the fixed subscriber unit 20 forwards the FAX AT instruction and ATDT terminating telephone number to the G3 data controller of the circuit data processing unit 43 of the WLL system 40 (S15). The G3 data controller of the circuit data processing unit 43 transfers the FAX AT instruction to G3 fax modem of the circuit data processing unit 43 (S16), and forwards the terminating telephone number to the main processing unit42 of the circuit data processing unit 43 (S17).

Accordingly, the main processing unit 42 of the circuit data processing unit 43 requests starting of the carrier detection to the G3 data controller of the circuit data processing unit 43 (S18).

The G3 data controller of the circuit data processing unit 43 transfers ATD instruction to the G3 FAX modem of the circuit data processing unit 43 (S19). At this stage, if the G3 data controller of the circuit data processing unit 43 is received "+FCON, +FDIS:OK" signal from the G3 FAX modem of the circuit data processing unit 43 (S2), transfers a message confirming modem connection to the main processing unit 42 after considering that the modem connection is completely performed (S21).

At this stage, the setting time of the modem link between the originating G3 facsimile/telephone 10 and the fixed subscriber unit 20, and between the G3 FAX modem of the circuit data processing unit 43 and the fixed subscriber unit 20 are different each other, since it is required to a constant time to set up the modem link between the terminating G3 FAX telephone and the G3 FAX modem of the circuit data processing unit 43 of the WLL system 40. Thus, the fixed subscriber unit 20 temporally stores the FAX data from the modem controller 21 in the step of transmitting the FAX data in the data buffer 23 (S22).

Under these procedures, if the G3 FAX modem of the circuit data processing unit 43 forwards +FCON,+FDIS:OK signal to the protocol processing unit 24 in accordance with that the modem connection is completely performed between the G3 facsimile/telephone and the FAX modem of the circuit data processing unit 43 (S23), the protocol processing unit 24 of the fixed subscriber unit 20 forwards the terminating connection message to the central controller 22 of the fixed subscriber unit 20, and then forwards the terminating connection confirmation message after a constant time is passed (S24, S25).

At this stage, the WLDTE of the fixed subscriber unit 20 forwards "AT+FDT" signal which content is requested to negotiate parameters to be forwarded the FAX data to the G3 FAX modem of the circuit data processing unit 43 (S26), and receives "+FDCS (or +FCS) which represent the negotiation results from the G3 FAX modem of the circuit data processing unit 43 (S27). Then, the G3 FAX modem of the circuit data processing unit 43 forwards a connect message representing complection of the modem connection to the WLDTE.

Next, if the central controller 22 of the fixed subscriber unit 20 receives "XON" signal representing starting of the FAX data transmission from the terminating G3 facsimile/telephone, the central controller 24 forwards the FAX data to the G3 facsimile/telephone 10, controlling the data buffer 23 (S28~S3).

While, if the FAX message from the G3 facsimile/telephone 10 is completely forwarded to the modem controller 21 if the fixed subscriber unit 20, then the G3 facsimile/telephone 10 forwards an end of message (EOM) (S31). Next, the modem controller 21 notifies a state that the FAX message transmission is completely performed (S32), and then forwards a message confirmation (MCF) signal representing massage confirmation to the G3 facsimile/telephone 10 (S33).

If the FAX data transmission is completely performed from the fixed subscriber unit 20 to the terminating G3 facsimile/telephone, forwards a transmission completion message (for example "O.K.") to the WLDTE of the fixed subscriber unit 20 (S34). Then, the WLDTE forwards the transmission completion message to the central controller 22 to notify completion of the FAX data communication (S35) Then, the WLDTE of the fixed subscriber unit 20 forwards "AT+FET" signal to the modem of the circuit data processing unit 43 (S36) and receives "+FPTS,OK" signal as a response message thereof (S37).

In the preferred embodiment of the present invention, the T1 time is determined at 35 5 second, the T2 time 6 1 second, and the T3 time 3 10 1 second, and also each the time period may be varied.

In the case of the origination for the FAX data, the central controller 22 of the fixed subscriber unit 20 confirms the origination call and appropriately controls the corresponding modem of the modem controller 21 for the wireless area using the AT instruction, if the processing capability of the wireless area using in response to the wire area. Such feature is very important to process the originating call for FAX service in real time.

Further, the origination operation of the FAX data having multiple pages will be explained hereinafter.

Figure 4B:
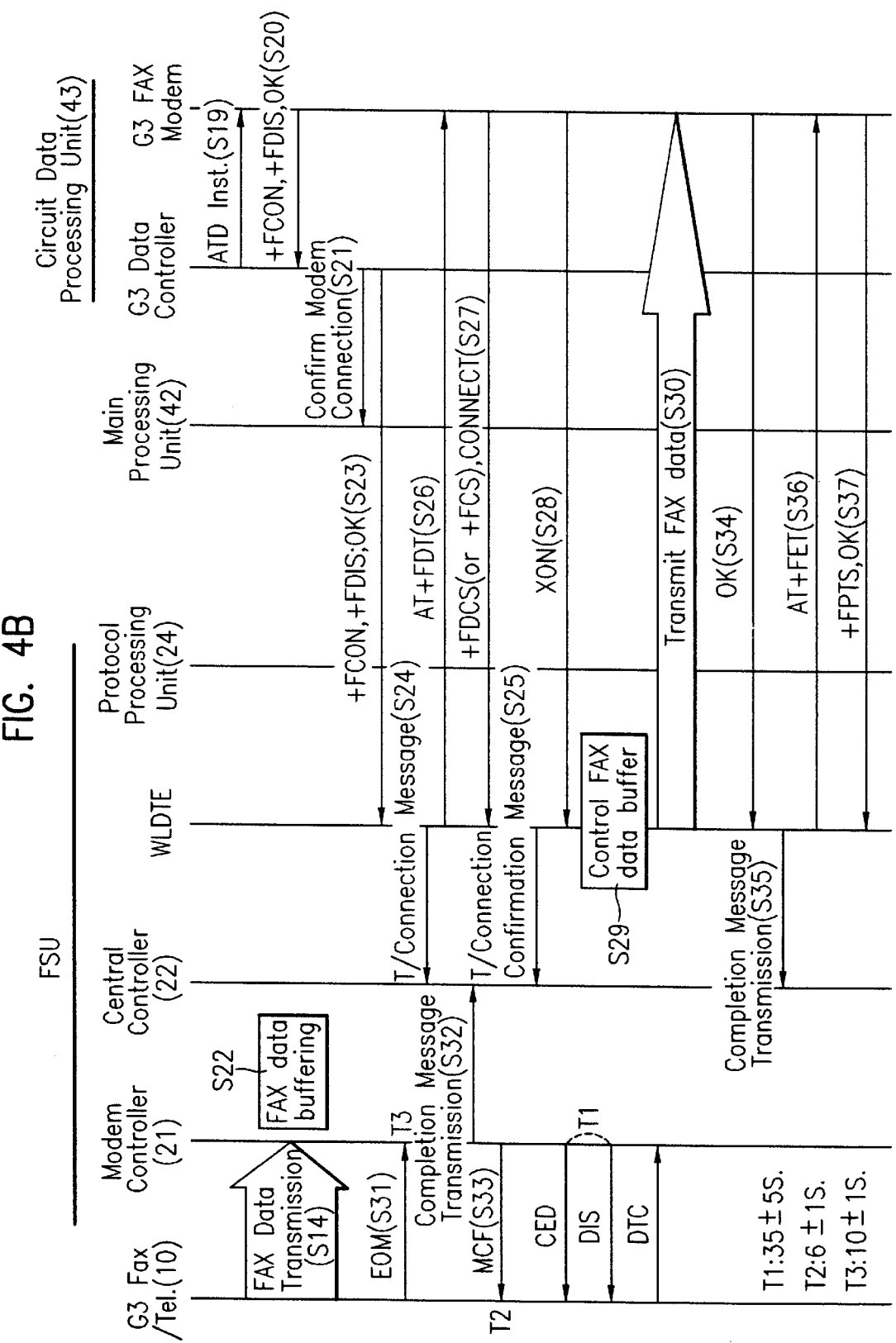

With reference to FIG. 4B, the central controller 22 of the fixed subscriber unit 20 provides the MCF signal to the G3 facsimile/telephone 10 within the T2 time after receiving the EOM signal from the G3 facsimile/telephone 10 (S31, S33). Next, the G3 facsimile/telephone receives the CED and DIS signals in a next phase step when the multiple pages are transmitted as shown in FIG. 4B, and forwards the DTC and tracing to the modem controller 21 of the fixed subscriber unit 20. Then, the time for the DIS is processed after temporally holding within T1 time as mentioned above manner. Wherein, the T1 time may be varied according to the confirmation of the FAX data buffer such as the step S35.

Figure 5A:
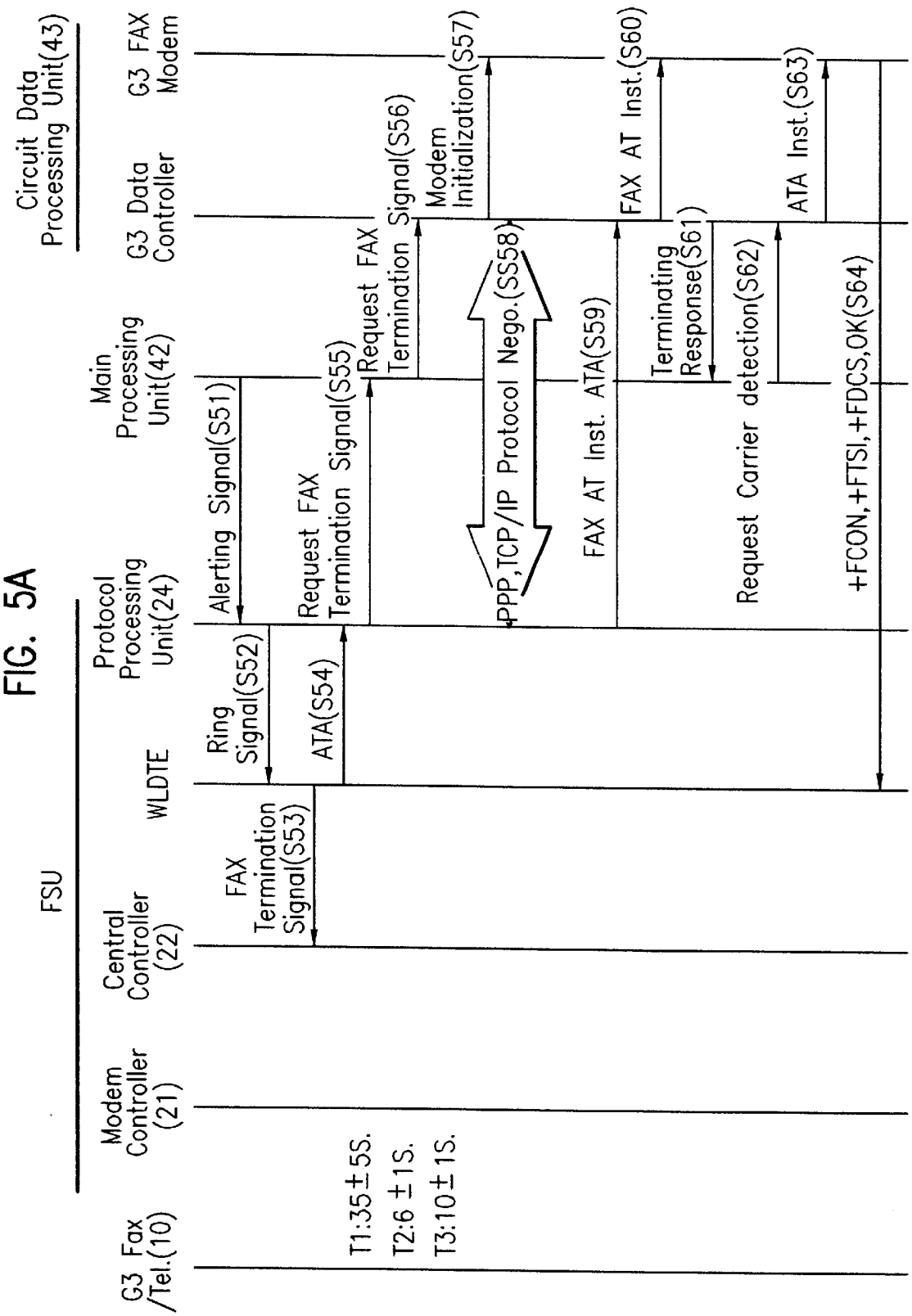
FIGS. 5A and 5B are timing sequence diagrams illustrating terminating procedure for FAX data according to a preferred embodiment of the present invention.

Now, the terminating operation of the G3 facsimile/telephone will be explained with reference to FIG. 5A, in case that current mode for the G3 facsimile/telephone 10 is determined at the FAX reception mode by manual operation by the subscriber.

First, the main processing unit 42 of the WLL system 40 forwards an alerting signal to the protocol processing unit 24 of the fixed subscriber unit 20, if the WLL system 40 receives a FAX call request from a G3 facsimile/telephone 10 of a subscriber of self network of the WLL system 40 or the PSTN 50 (S51). Then, the protocol processing unit 24 of the fixed subscriber unit 20 forwards a ring signal to the WLDTE of the fixed subscriber unit (S52). The WLDTE forwards FAX terminating signal to the central controller 22 of the fixed subscriber unit 20 (S53), and then forwards "ATA" instruction to the protocol processing unit 24 of the fixed subscriber unit 20 (S54). Subsequently, the protocol processing unit 24 requests a FAX terminating signal to the main processing unit 42 of the WLL system 40 (S55). At this stage, the main processing unit 42 can easily checks the FAX termination signal since the G3 facsimile/telephone 10 is already determined at the FAX mode.

While, the main processing unit 42 of the WLL system 40 also checks the present service mode (for example, telephone service or FAX service) according to the number of the fixed subscriber unit 20 and calls the fixed subscriber unit 20 with the corresponding service option based on the circumstance that each telephone number of the fixed subscriber unit 20 and each FAX number are given thereto.

Then, the main processing unit 42 notifies the request of the FAX call, allocates a G3 FAX modem resource to RLP protocol processing unit 41 through the G3 FAX data controller (not shown) of the circuit data processing unit 43 (S56), and set up the radio link protocol (RLP) used in the an wireless area of the fixed subscriber unit 20 and the base station 30. Next, PPP, TCP/IP protocol is set up by a terminating signal request between modems of the protocol processing unit 24 of the fixed subscriber unit 20 and the circuit data processing unit 43 of the WLL system 40

Then, the protocol processing unit 24 of the fixed subscriber unit 20 forwards a FAX AT instruction and "ATA" instruction to the circuit data processing unit 43 of the WLL system 40 (S59). The G3 data controller of the circuit data processing unit 43 transfers the FAX AT instruction to the G3 FAX modem of the circuit data processing unit 43 (S6), and forwards a terminating response message to the main processing unit 42 of the circuit data processing unit 43 (S61). Accordingly, the main processing unit 42 of the circuit data processing unit 43 requests starting of a carrier detection to the G3 data controller of the circuit data processing unit 43 (S62). Thus, the G3 data controller transfers the ATA instruction to the G3 FAX modem of the circuit data processing unit 43 (S63).

Subsequently, the G3 FAX modem of the circuit data processing unit 43 of the WLL system 40 forwards "+FCON,+FTSI, +FDCS,OK" signal representing the modem connection completion with the originating G3 facsimile/telephone 10 to the WLDTE of the fixed subscriber unit 20 (S64). Then, the WLDTE of the fixed subscriber unit 20 forwards the origination information to the central controller 22 (S65). The central controller 22 forwards the alerting signal representing arrival of a terminating signal to the modem controller (S66), and transfers a ring signal representing arrival of the FAX signal to the G3 facsimile/telephone 10 connected to the fixed subscriber unit 20 (S67). The G3 facsimile/telephone 10 forwards the CED and DIS in turn to the modem controller 21 of the fixed subscriber unit 20 (S68, S69). The modem controller 21 forwards the DTC signal to the terminating G3 facsimile/telephone 10 after at least 25 second is passed, counting the T1 time period. If not, the protocol processing unit 24 forwards the DTC signal to the G3 facsimile/telephone 10 connected to the fixed subscriber unit 20 by notifying a connection confirmation message to the central controller 22 (S71, S72), when "FCFR,+FDCS:CONNECT" signal is arrived from the G3 FAX modem of the circuit data processing unit 43 (S70).

Subsequently, the modem controller 21 of the fixed subscriber unit 20 negotiates for state parameters with the terminating G3 facsimile/telephone 10 through the paging/training (S73). Then, if the negotiation is completely performed, the terminating G3 facsimile/telephone 10 forwards "CFR" signal representing the FAX data reception available state to the fixed subscriber unit 20 (S74).

While, the protocol processing unit 24 of the fixed subscriber unit 20 forwards the "AT+FDR" signal to the G3 FAX modem of the circuit data processing unit 43 (S75). Next, the protocol processing unit 24 receives the FAX data from the G3 FAX modem of the circuit data processing unit 43 (S76), the central controller 22 temporally stores the FAX data in the data buffer 23. Next, if the G3 facsimile/telephone 10 connected to the fixed subscriber unit 20 forwards the "CFR" signal representing reception available state to the central controller 22 (S77), the FAX data is transmitted to the G3 facsimile/telephone 10 from now on through the modem controller 21, controlling the data buffer 23 (S78, S79). At this stage, if the FAX data transmission is completely performed, the modem controller 21 of the fixed subscriber unit 20 forwards the EOM signal to the G3 facsimile/telephone 10 (S8). The G3 facsimile/telephone 10 forwards the MCF signal to the modem controller 21 to notify completion of the FAX data reception (S81).

While, the G3 FAX modem of the circuit data processing unit 43 forwards the +FET,FPTS,OK signal representing FAX data transmission completion to the WLDTE (S82). The WLDTE forwards a message confriming the FAX data message completion to the central controller 22 of the fixed subscriber unit 20 (S83).

In the case of the termination for the FAX data, the capability of modems in the modem controller 21 should be set as equivalent to that of the WLL system 40. Such feature is very important to process the terminating call for FAX service in real time.

Further, the termination operation of the FAX data having multiple pages will be explained hereinafter.

Figure 5B:
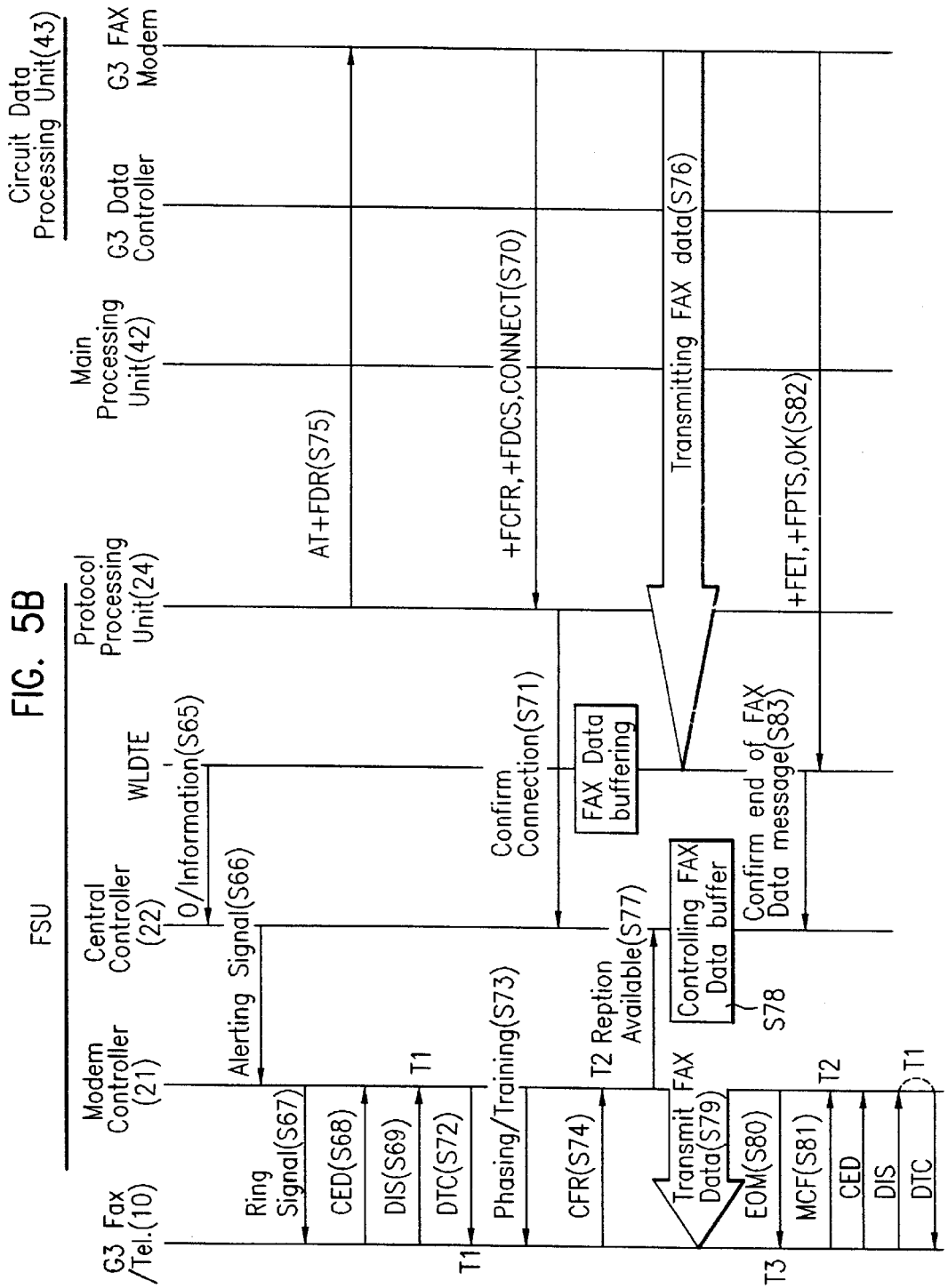

With reference to FIG. 5B, the G3 FAX modem checks the +FET information which is forwarded to the WLDTE (S82). Then, the modem controller 21 forwards the EOM signal within T2 time to G3 facsimile/telephone 10 connected to the fixed subscriber unit 20 (S8), and performs a next phase operation as shown in FIG. 5B. At this stage, if the +FET information indicates that the current page is not last page, the terminating procedure described as above may be performed in the next phase.

According to the present invention, it is provided to the wireless local loop system selectively provides the existed wireless voice service and the G3 FAX service without additional network elements, maintaining the service option same as the digital FAX service in the WLL network by connecting the RJ-11 jack between the analog G3 facsimile/telephone and the fixed subscriber unit. Also, in the present invention, the FAX data service as close as the real time is available, while the memory capacity used for the data buffer is minimized by properly using the timers used in each step of the ITU-T T.30.

What is claimed is:

1. A CDMA wireless local loop (WLL) system, comprising:
   a first facsimile subscriber terminal;
   at least one fixed subscriber unit having a first facsimile modem and connected to the first facsimile subscriber terminal, the fixed subscriber unit performing a wireless facsimile communication function by temporarily storing facsimile data transmitted to or received from the first facsimile subscriber terminal in order to provide real-time facsimile service;
   a base station communicating with the fixed subscriber unit by a wireless connection; and
   a WLL processing unit having a second facsimile modem and connected to a wire network, a wireless network, and the base station, the WLL, processing unit controlling a data path and a signaling path in accordance with service option information in a communication signal received from at least one of the wire network, the wireless network, and the base station, wherein the fixed subscriber unit and the WLL processing unit cooperate to transmit said facsimile data between the first facsimile subscriber terminal and a second facsimile subscriber terminal through the first facsimile modem and the second facsimile modem, and wherein at least one of the WLL processing unit, the first facsimile subscriber terminal, and the second facsimile subscriber terminal adds imaginary facsimile data to said facsimile data in order to ensure that said facsimile data is transmitted in a continuous manner.

2. The system of claim 1, wherein the fixed subscriber unit includes:

a modem controller which causes communications between the first facsimile subscriber terminal and the fixed subscriber unit to occur based on a predetermined protocol;

a central controller which controls an operation of the fixed subscriber unit to support the wireless facsimile communication function;

a data buffer for buffering said facsimile data in accordance with a first control signal from the central controller; and a protocol processing unit which sends a facsimile data call request to the WLL processing unit in accordance with a second control signal of the central controller.

3. The system of claim 2, wherein the data buffer memory temporarily stores said facsimile data during an initializing process of the first facsimile subscriber terminal or the second facsimile subscriber terminal.

4. The system of claim 2, wherein the modem controller provides a dial tone or a ring tone to the first facsimile subscriber terminal and detects a DTMF tone.

5. The system of claim 1, wherein the WLL processing unit comprises:

a main processing unit for discriminating a service option designated by one of the first facsimile subscriber terminal and the second facsimile subscriber terminal;

a protocol processing unit for controlling a wireless data path for conveying said facsimile data in accordance with the service option;

a circuit data processing unit for assigning the second facsimile modem if facsimile data service is required from the protocol processing unit, and for setting a wireless link protocol between the fixed subscriber unit and the base station; and a relay connecting unit, coupled to the circuit data processing unit, for providing signaling and data paths to the wire/wireless network.

6. The system of claim 1, wherein the fixed subscriber unit has at least one telephone number for voice service and at least one facsimile number for facsimile service.

7. A method of carrying out facsimile data service in a wireless local loop (WLL) network which has a plurality of facsimile subscriber terminals, at least one fixed subscriber unit including a first facsimile modem, a base station, and a WLL processing unit including a second facsimile modem, said method comprising:

a) assigning the first facsimile modem in the fixed subscriber unit and the second facsimile modem in the WLL processing unit according to a request from one of a first facsimile subscriber terminal connected to the fixed subscriber unit and a second facsimile subscriber terminal in communication with the WLL processing unit;

b) setting up a wireless link protocol between the fixed subscriber unit and the WLL processing unit;

c) setting up a call connection between the fixed subscriber unit and the WLL processing unit by initializing the first facsimile modem and the second facsimile modem, wherein the fixed subscriber unit temporarily stores transmitting or receiving facsimile data in a data buffer during initialization of the first facsimile modem and the second facsimile modem;

d) exchanging system parameters between the fixed subscriber unit and the WLL processing unit; and e) transmitting said facsimile data from the first facsimile subscriber terminal to the second facsimile subscriber terminal, or from the second facsimile subscriber terminal to the first facsimile subscriber terminal, over said call connection, said transmitting step including adding imaginary facsimile data to said facsimile data in order to make transmission of said facsimile data between the first facscimile subscriber terminal and the second facsmile subscriber terminal continuous.

8. The method of claim 7, wherein said adding step is performed by the WLL processing unit.

9. The method of claim 7, wherein the imaginary facsmile data includes at least one of virtual fax data and fill data.

10. The method of claim 7, wherein step d) includes:

negotiating PPP and TCP/IP protocols between the fixed subscriber unit and the WLL processing unit.

11. The method of claim 7, wherein step e) includes:

temporarily buffering said facsimile data in the data buffer by the fixed subscriber unit until a path for a wireless area is set up for transmitting said facsimile data; and adjusting to output the buffered facsimile data in accordance with a bandwidth set up in the wireless area.

12. The method of claim 7, further comprising:

forwarding a called station identification (CED) signal and a digital identification signal (DIS) from the fixed subscriber unit to one of the first facsimile subscriber terminal and the second subscriber terminal which serves as an originating terminal in a case of transmitting multiple pages; and repeatedly performing steps d) and e) between the originating terminal and the WLL processing unit.

13. The method of claim 7, further comprising:

transmitting voice data from the first facsimile subscriber terminal to the second facsimile subscriber terminal, or from the second facsimile subscriber terminal to the first facsimile subscriber terminal, over said call connection.

* * * * *